May 5, 1936.　　　A. N. SAMMARONE　　　2,039,456
ELECTRIC MOTOR UNIT
Filed Nov. 14, 1931　　　3 Sheets-Sheet 1

INVENTOR
Amato N. Sammarone
BY
H. R. Van Deventer
ATTORNEY

May 5, 1936.     A. N. SAMMARONE     2,039,456
ELECTRIC MOTOR UNIT
Filed Nov. 14, 1931     3 Sheets-Sheet 2

INVENTOR
Amato N. Sammarone
BY
*H. R. Van Deventer*
ATTORNEY

May 5, 1936.  A. N. SAMMARONE  2,039,456
ELECTRIC MOTOR UNIT
Filed Nov. 14, 1931   3 Sheets-Sheet 3

INVENTOR
Amato N. Sammarone
BY
H. R. Van Deventer
ATTORNEY

Patented May 5, 1936

2,039,456

UNITED STATES PATENT OFFICE 2,039,456

ELECTRIC MOTOR UNIT

Amato N. Sammarone, Akron, Ohio

Application November 14, 1931, Serial No. 574,943

4 Claims. (Cl. 172—120)

This invention relates to improvements in electric motor units, and has for an object the provision of an electric motor having a stator core to which the windings may be applied externally to the rotor bore thereof.

Another object of the invention is the provision in an electric motor of two cylindrical chambers, one surrounding the other, the rotor and its bearings being enclosed in the inner chamber and the stator windings being enclosed in the outer chamber.

A further object of the invention is the provision of an electric motor having the stator windings outside of the rotor zone and therefore less liable to mechanical injury and contamination by oil and foreign matter from the rotor zone.

Other objects and advantages of this electric motor will be apparent to those skilled in the art from a study of this specification and the appended claims.

This application is a continuation in part of application Serial Number 401,128 filed October 21, 1929.

In the present types of induction motors, the stator slots communicate with the rotor bore and to wind stators of this type, it is necessary to push the wires into the slots from the rotor bore. This is inconvenient because of the necessity of working in the small area of this bore.

In the improved motor described and claimed herein the stator comprises a laminated structure in the form of a thin, hollow cylinder having radial arms extending outwardly. These radial arms are equi-distant from each other and the spaces between them form slots for the stator windings.

The rotor bore is cylindrical and its interior surface is not broken by any slots. In this type of stator the windings may be inserted in the slots, between the radial arms, from the outside of the stator and all wires while being inserted in the slots are in full view of the operator and close scrutiny can be kept on the insulation of the wires and the insulation between the wires and the slots. A much neater and smoother winding is obtained because the windings do not become bent up and distorted as is the case when the windings are inserted from inside the rotor bore in ordinary types of motors.

In this motor it will be seen that a thin wall of metal appears between the bottoms of the slots and the rotor bore. When the stator winding is excited by alternating current a rotating field is thereby set up. This thin wall of metal between the bottoms of the slots and the bore acts as a path for some of the lines of force of the rotating field and the rotor iron forms the path for the balance of the flux of this rotating field.

If the cross section of the wall of metal between the bottoms of the slots and the rotor bore is increased more of the flux of the rotating field will travel in this area and less flux will travel in the rotor iron.

By making this cross section small, a correspondingly small proportion of the rotating field will travel around in this section and consequently more of the rotating field will act upon the rotor.

By this construction, a starting characteristic is obtained similar to that of motors in which the copper bars are deeply set within the iron of the rotor, the difference being that in the new and improved motor described herein the rotor would be constructed as usual and the copper bars in the rotor would not be deeply set in the iron thereof. However, the cross section of the stator between the bottom of the slot and the rotor bore would give in effect the greater depth, the main difference being that this metal giving the depth is stationary. This gives low starting current and quiet running characteristics.

Referring to the drawings.

Figure 1:
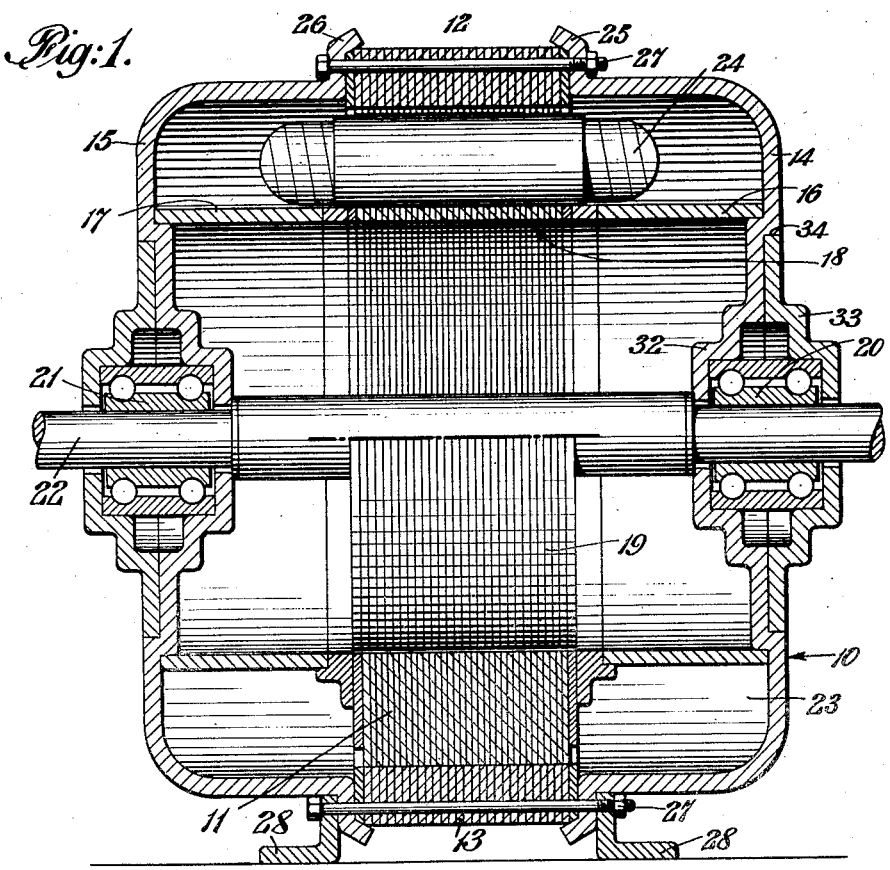
Figure 1 is an elevation, partly in section, of a preferred embodiment of the invention.
Figure 2:
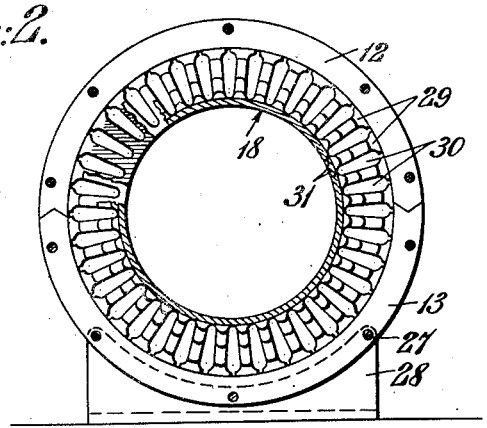
Figure 2 is an end view of the device shown in Figure 1 with the rotor and end plates removed therefrom.

Referring to Figure 1, the motor designated generally by the numeral 10 has a stator which will presently be described more in detail. Two half rings 12 and 13 surround and enclose the stator and form a support for the end plates 14 and 15. A sleeve 16 is supported by the stator and the end plate 14, and a similar sleeve 17 is supported by the stator and the end plate 15. These sleeves have their interiors in line with the rotor bore 18 and together with the stator and end plates form a chamber enclosing the rotor 19. Suitable bearings 20 and 21 are provided in the end plates 14 and 15 respectively for supporting the rotor shaft 22.

A second chamber 23 is formed between the end plates 14 and 15 and the sleeves 16 and 17, this chamber being isolated from the chamber 18 by the sleeves before mentioned.

Suitable stator windings are located within the chamber 23, one of these coils being designated by the numeral 24. The end plates 14 and 15 have beveled flanges 25 and 26 respectively which member up with corresponding beveled edges of the closure rings 12 and 13 and are thereby centralized with respect to the rotor bore. These end plates may be secured to the closure rings in any suitable manner, such as by bolts 27, and suitable feet 28 are provided to form a suitable mounting for the motor.

The stator 11 is made up of laminations and has a plurality of radial arms 29 extending outwardly, and the spaces between these arms form slots 30 into which windings are placed. A small body of metal 31 is provided between the bottoms of the slots 30 and the rotor bore 18 and forms a support for the radial arms 29. This small body or mass of metal may be made of various thicknesses to obtain different specific results. In the preferred form this mass of metal is comparatively thin to give good starting and running characteristics.

A small portion of the rotating magnetic field travels through this mass of metal and the balance of the rotating magnetic field travels via the rotor. If this mass of metal 31 were made extremely thick the greater part of the flux of the rotating field would travel therein and only a small part would reach the rotor. Therefore, by making this mass of metal 31 of different thicknesses many different results may be obtained.

In this form of construction, winding the stator is a much simpler and cheaper job than heretofore, as the insulation on the windings is less liable to injury during the winding process and the winding may be done much faster due to the fact that the operator does not have to work in the small area, as is the case with ordinary types of motors.

The closure rings 12 and 13 are made up of laminations and are finished inside to form a close fit against the radial arms 29 of the stator without any air gap therebetween, forming a return path for the magnetic flux.

The bearing 20 is supported between cupped-in portion 32 of the end plate 14 and a removable oppositely disposed cupped portion 33. This portion 33 is accurately located in the end plate 14 by the stepped portion 34. The bearing 21 is located in the end plate 15 in the same manner. Suitable starting devices (not shown) may be provided but as they are old in the art they are not herein described in detail. However, for example, if the motor is wound "split-phase" a suitable centrifugal starting switch may be provided or if the winding is made for a condenser type motor in which no starting switch would be necessary a suitable condenser would be provided. In a condenser type motor in which a large capacity is used for starting and a smaller capacity for running, a suitable centrifugal switch may be provided for cutting out the extra capacity after the motor starts and for cutting the same into the circuit when the motor stops.

Figure 3:
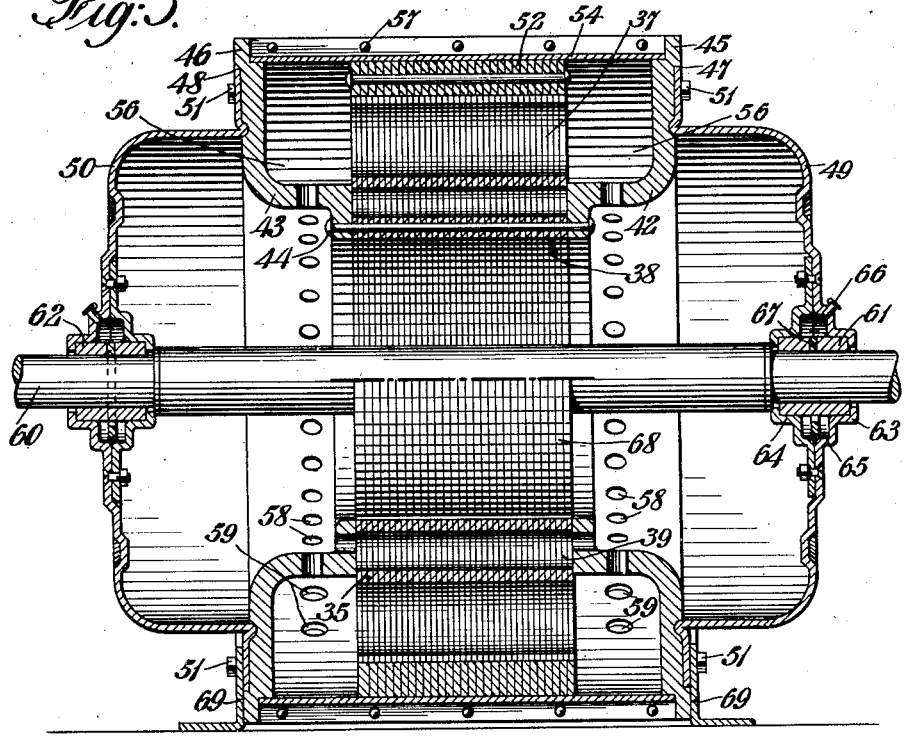
Figure 3 is a modification of the device shown in Figure 1 in which the windings may be located a greater distance away from the rotor.
Figure 4:
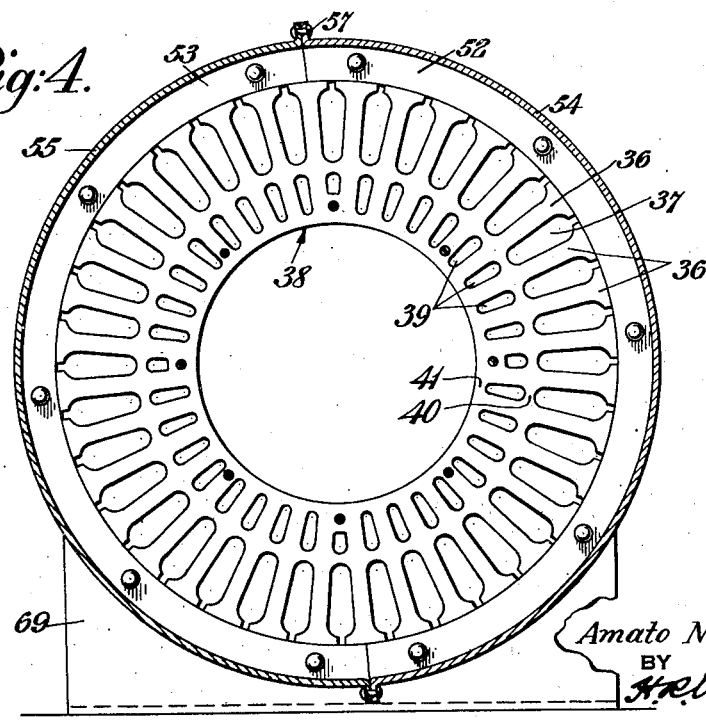
Figure 4 is a sectional view showing the slot arrangement.

In the modification shown in Figures 3 and 4, a laminated stator 35 has radial arms 36 extending outwardly and the space forming a plurality of slots 37 between these arms is provided to accommodate the stator windings.

In this modification, due to the form of construction a greater space is required between the bottoms of the winding slots 37 and the rotor bore 38, and ordinarily the metal therebetween would form a path for practically all of the rotating magnetic field. To offset this effect, a plurality of openings 39 are provided so that between the bottom of the winding slot 37 and the rotor bore 38 a thin metallic body 40 and a second thin metallic body 41 are formed, and these small masses form a path for a small portion of the rotating magnetic field. The openings 39 also serve as air ducts and improve the ventilation of the motor.

The laminations of the stator 35 are clamped together by suitable clamping rings 42 and 43 and secured by any suitable means such as rivets, one of which is shown at 44. The rings 42 and 43 are provided with suitable flanges 45 and 46 respectively and these flanges are machined at 47 and 48 to locate and support the end plates 49 and 50 respectively. These end plates are preferably of stamped material and may be secured to the flanges 45 and 46 in any suitable manner such as bolts 51.

A laminated closure ring is made in two halves 52 and 53. These halves are secured to suitable halves 54 and 55 of a clamping ring. The stator windings (not shown) are located in the cylindrical chamber 56 formed between the stator 35 and flange 45 of the clamping ring 42 on one end and between the stator on the flange 46 of the ring 43 on the other end, and pass through the slots 37 therebetween.

After the stator is wound, the halves of the closure ring 52 and 53 are placed in position on the stator as shown in Figure 4 and the halves of the clamping ring 54 and 55 are secured together by any suitable means such as rivets 57, thereby forming a return path for the magnetic flux and at the same time a portion of the clamping ring extending beyond the closure ring encloses the windings in the chamber 56.

In cases where ventilation is desired, suitable vents 58 may be provided in the clamping rings 42 and 43, and similarly disposed vents 59 may be provided in the halves of the clamping rings 54 and 55 through which air may circulate and thereby pass over the stator windings.

This air circulation may be accentuated by placing a fan (not shown) on the rotor shaft 60. The rotor shaft 60 is provided with suitable bearings 61 and 62. The bearing 61 is supported between a cupped portion 63 of the end plate 49 and a similar detachable cupped portion 64 suitably secured to the end plate, these cupped portions being oppositely disposed so that an oil reservoir 65 is formed therebetween. A suitable oil filler 66 is provided for putting oil into the reservoir and a suitable ring oiler 67 lubricates the shaft as it rotates.

The bearing 62 in end plate 50 is constructed in the same manner.

The rotor 68 may be of the usual squirrel caged type. Suitable feet 69 may also be secured to the motor by some of the end plate bolts 51.

Figure 7:
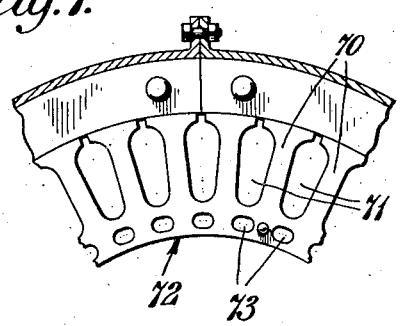
Figure 7 is a fragmentary view showing one method of clamping the outside ring about the stator.

In the modification shown in Figure 7, the stator has radial arms 70 extending outwardly and forming therebetween winding slots 71 in the same manner as previously described, the main difference in this modification being that the distance between the bottom of the slot 71 and the rotor bore 72 is substantially smaller and correspondingly smaller perforations 73 are provided to reduce this cross section of metal.

Figure 5:
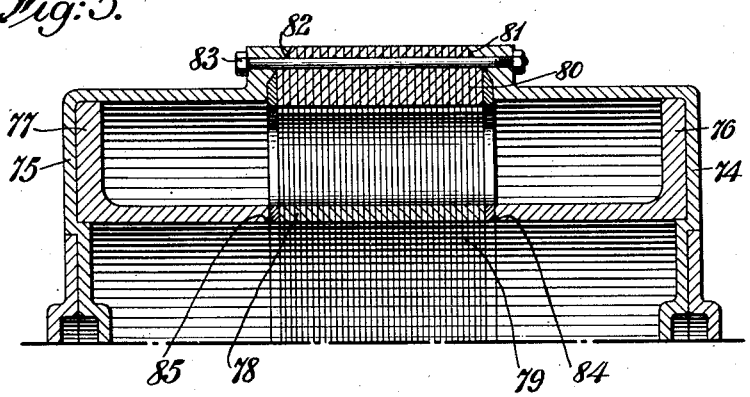
Figure 5 is a fragmentary view showing a further modification of the device shown in Figure 3.
Figure 6:
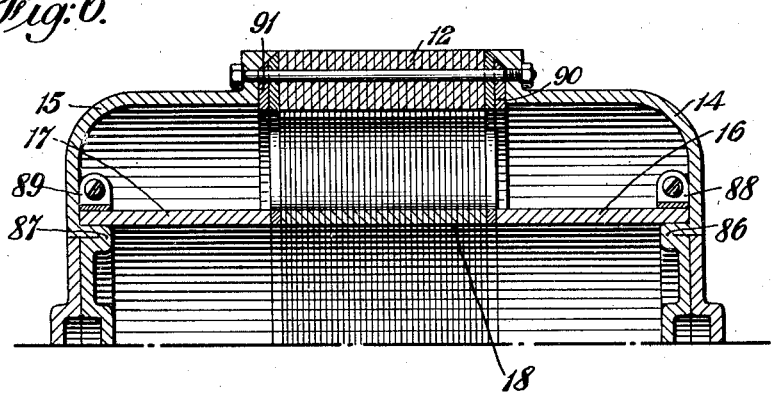
Figure 6 is a fragmentary view showing a modification of the device shown in Figure 1.

In the modification shown in Figure 5, end plates 74 and 75 carry flanged sleeves 76 and 77 respectively which member up against the metallic portion 78 of the stator which immediately surrounds the rotor bore 79 when the motor is assembled. These end plates are located and supported by the closure ring 80 and are provided with tapered portions 81 and 82 which tend to clamp the closure ring tightly against the stator when the bolt 83 is tightened up.

Another variation of this structure was made in which the flanged sleeves were circumferentially welded on to the stator at points indicated in the section by the numerals 84 and 85 respectively. It was necessary to machine the surfaces of the sleeves 76 and 77 after welding.

In the modification shown in Figure 7 which is a slight variation of Figure 1, the sleeves 16 and 17 are clamped to bossed portions, designated respectively by the numerals 86 and 87, in the end plates 14 and 15 by clamps 88 and 89 respectively.

To facilitate in lining up the end plates 14 and 15 with respect to the rotor bore 18, floating beveled rings 90 and 91 are provided on either side of the closure ring 12.

It can be readily seen that in either of the modifications shown and described herein that windings may be applied to the stator without having to worry them in through the rotor bore. All of the work of winding and insulating the stator can be done from the outside and much greater speed will be attained in applying these windings, the insulation may be more carefully looked after, and the connections to and between the various coils of the windings may be made with great facility.

By proportioning the thickness of metal between the bottoms of the winding slots and the rotor bore, a variety of results are obtained and on account of its quiet and smooth operation and comparative freedom of vibration, this motor has a great many applications where the present type of motor is objectionable. This thickness of metal may be in a way compared to the thickness of metal in rotors having their copper bars deeply set within the iron, the difference being that in this new and improved type of motor this iron does not rotate with the rotor but is stationary and forms a support for the radial arms made integral therewith and between which the winding slots are formed. This makes it possible to apply the windings from the outside and when the closure ring is applied a good magnetic path is provided for the rotating field of the stator.

This form of construction may be used for either A. C. or D. C. motors and many modifications may be made in the device without departing from the spirit of the invention or the scope of the appended claims.

What is claimed is:

1. In an electric motor structure, a stator comprising annular laminations with outwardly extended radial arms integral therewith and forming a plurality of slots therebetween, windings in said slots, a split removable ring contacting with said arms enclosing said windings in the slots and forming a return path for magnetic flux in said stator, end plates secured to said ring and adapted to wedge the ring into intimate contact with the outer surfaces of said arms, bearings in said end plates, a shaft carried by said bearings, a rotor supported within said annular portion by said shaft, and straight sleeves supported between the end plates and the sides of said stator in line with said annular portion thereof and isolating said windings from said rotor.

2. In an electric motor structure, a stator composed of annular laminations with outwardly extended radial arms integral therewith and forming a plurality of slots there-between, windings in said slots, a split removable ring contacting with said arms and enclosing said windings in the slots, end plates secured to said ring and adapted to clamp the ring tightly against the ends of said arms, bearings in said end plates, a shaft carried by said bearings, a rotor supported within said annular portion by said shaft, and annular sleeves supported by the end plates and membering up with the sides of said stator in line with said annular portion thereof and isolating said windings from said rotor.

3. In an electric motor, a laminated stator structure of hollow cylindrical form having radial arms integral therewith extending outwardly and forming slots therebetween, windings disposed within said slots, a split laminated structure having beveled edges and positioned about said stator in contact with said arms, end plates having tapered rims supported by said last structure said tapered rims engaging said bevels and serving as clamps for holding said last structure about said stator structure, a rotor having its shaft journaled in said end plates, and openings in the cylindrical portion of said stator forming horizontal vents therethrough adjacent to said windings.

4. In an electric motor unit structure, a stator having an inner annular portion having a rotor cavity formed therein, a plurality of arms integral therewith extending outwardly and forming therebetween a plurality of open slots, a plurality of closed slots formed in said annular portion for reducing the metallic cross-section thereof, windings in the open slots, a removable closure ring having beveled edges positioned about and contacting with said arms forming a return path for magnetic flux, a rotor within said annular portion, and end plates having beveled flanges membering up with the beveled edges of said closure ring for centralizing said rotor within said annular portion, said closed slots being positioned between said windings and the rotor cavity.

AMATO N. SAMMARONE.